United States Patent [19]
Grosseau

[11] 3,894,604
[45] July 15, 1975

[54] AUTOMOBILE VEHICLES
[75] Inventor: Albert Grosseau, Chaville, France
[73] Assignee: Societe Anonyme Automobiles Citroen, Paris Cedex, France
[22] Filed: Mar. 5, 1973
[21] Appl. No.: 337,842

[30] Foreign Application Priority Data
Mar. 28, 1972 France.............................. 72.10920

[52] U.S. Cl............... 180/64 R; 180/12; 180/54 F
[51] Int. Cl................................................ B60k 5/04
[58] Field of Search...... 180/11, 12, 54 F, 58, 64 R; 296/35 R

[56] References Cited
UNITED STATES PATENTS

| | | | |
|---|---|---|---|
| 840,695 | 1/1907 | Hanks | 180/64 R X |
| 1,073,073 | 9/1913 | Huff | 180/64 R |
| 1,422,622 | 7/1922 | Riddle | 180/64 R |
| 2,066,530 | 1/1937 | Hoffman | 180/64 R X |
| 2,199,517 | 5/1940 | Best | 180/64 R X |
| 2,776,721 | 1/1957 | Giacosa | 180/12 |
| 2,972,498 | 2/1961 | Kelley | 296/35 R |
| 3,165,161 | 1/1965 | Nallinger | 180/64 R X |
| 3,302,740 | 2/1967 | Giacosa | 180/64 R X |
| 3,326,501 | 6/1967 | Cauvin | 180/64 R X |

*Primary Examiner*—Leo Friaglia
*Assistant Examiner*—Terrance L. Siemens
*Attorney, Agent, or Firm*—Stevens, Davis, Miller & Mosher

[57] ABSTRACT

The vehicle comprises a chassis adapted to connect the front axle to the rear axle and a body connected resiliently to the chassis. The engine of the vehicle is fixed on the chassis by linking means opposing any substantial deflection between the engine and the chassis in longitudinal and transverse directions of the vehicle. The engine thus contributes to the rigidity of the chassis. The chassis may comprise two longitudinal members; the engine is fixed between two of the ends of these longitudinal members so as to serve as a cross-member for the chassis.

8 Claims, 5 Drawing Figures

3,894,604

AUTOMOBILE VEHICLES

The invention relates to improvements in or to automobile vehicles of the type which comprise a chassis adapted to connect the front axle to the rear axle and a body elastically connected to the chassis.

The invention relates, more particularly, because it is in this case that its application seems to have the most advantage, but not exclusively, to passenger automobiles.

It is another object of the invention to render the abovesaid automobile vehicles such that they respond to the passive essentials of safety (that is to say in the case of impact) and comfort, whilst having good qualities of stability and of precision in steering control.

According to the invention, an automobile vehicle of the type defined above, is characterised by the fact that the engine of the vehicle is fixed on the chassis by linking means resisting any substantial deflection between the engine and the chassis in longitudinal and transverse directions of the vehicle so that the engine contributes to the rigidity of the chassis.

Generally, the chassis comprises two longitudinal members and the engine is advantageously fixed between two of the ends of these longitudinal members so as to serve as a cross-member for the chassis.

Preferably, the wheels of the vehicle situated, longitudinally, at the level of the engine, are borne by suspension arms pivoted directly on the engine or on a support element of the engine, so that the assembly forms an easily removable unit.

The invention consists, apart from the features mentioned above, of certain other features which will be more explicitly considered below with regard to preferred embodiments of the invention which will be described with reference to the accompanying drawings, but which are in no way limiting.

FIG. 1 of these drawings shows, diagrammatically, with parts removed, the front of an automobile vehicle constructed according to the invention.

Figure 4:
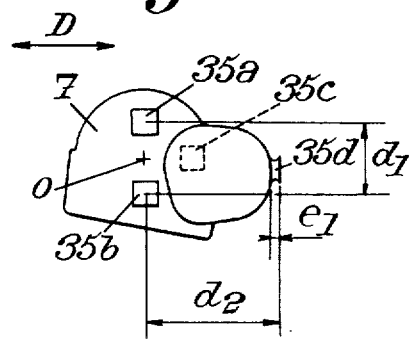
FIG. 4 is a view in elevation of an engine equipped with linking means to the chassis, for a vehicle according to the invention.
Figure 5:
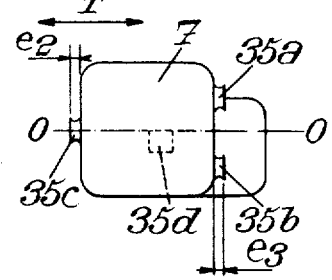

FIG. 5, lastly, is a view from the left with respect to FIG. 4.

Figure 1:
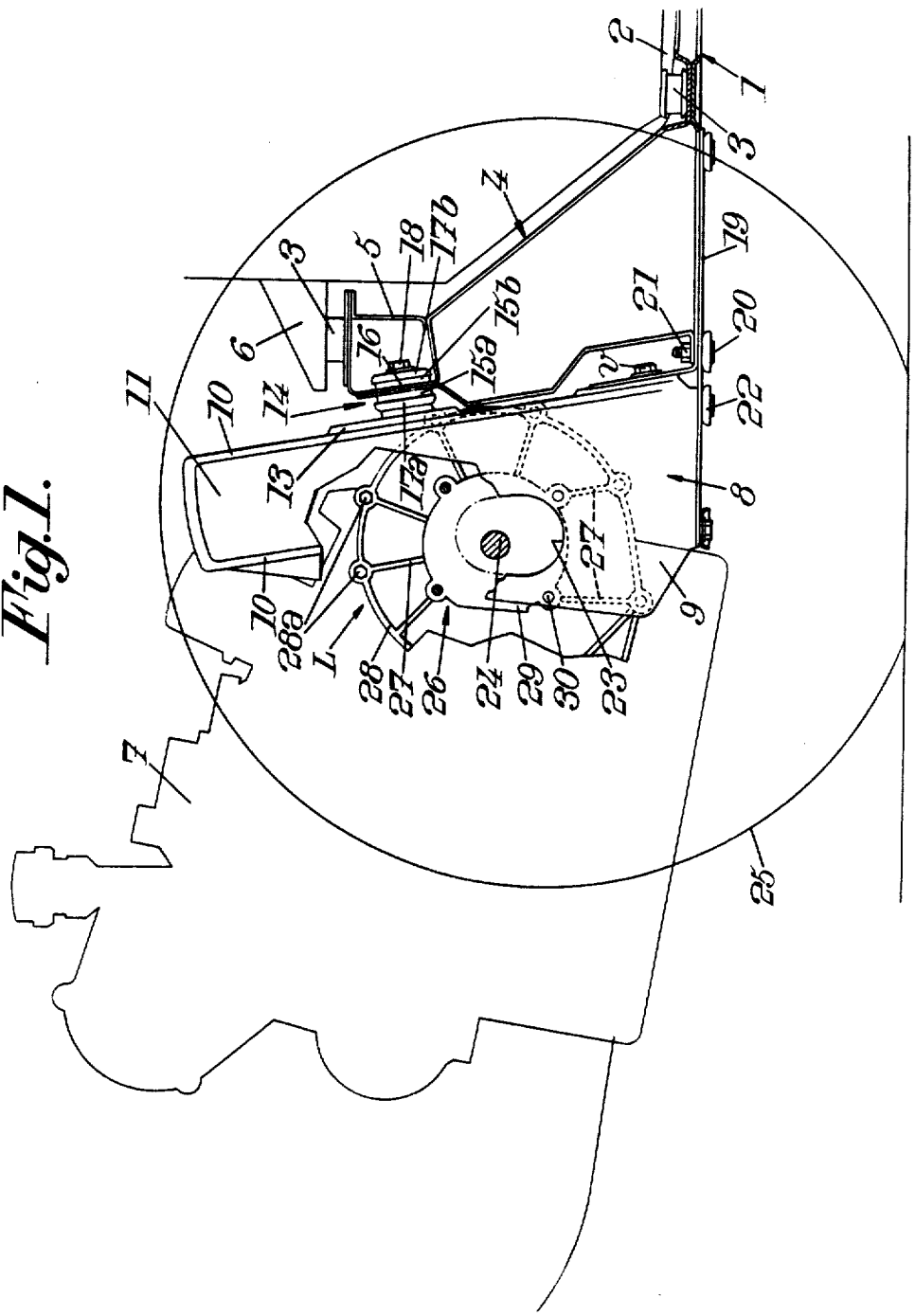

Referring to FIG. 1, there can be seen the front of an automobile vehicle comprising a chassis 1 adapted to connect the front axle to the rear axle. The term "axle" is used in a very general sense and denotes, respectively, the holding means for the front and rear wheels of the vehicle.

The vehicle also comprises a body 2 connected elastically to the chassis 1, for example by blocks of elastomeric material 3. Advantageously these blocks are arranged so as to enable deflections between the body and the chassis in the longitudinal direction of the vehicle and to prevent practically any other substantial deflection; this result can be obtained with blocks 3 of slight thickness and of shape elongated in the longitudinal direction of the vehicle.

The chassis 1 is lifted at the front to form a sort of caisson 4 surmounted by a hollow transverse member 5. The body 2 comprises at the front, at least one arm 6 enabling the fixing of the body 2 to be ensured by a block of elastomeric material 3 on the transverse member 5.

The engine 7 of the vehicle is fixed on the chassis 1 by connecting means L resisting any substantial deflection, between the engine and the chassis, in the longitudinal and transverse directions of the vehicle. The term "engine" is employed in a very general sense and is applied both to the engine and to the motor-propellant unit.

The connecting means L comprise on each side of the engine 7 a support element 8, rigid, in the form of a hollow caisson and comprising two lateral cheeks 9, of rigid sheet metal, reinforced by ribs 10. The support elements 8 can, also, be formed of cast metal, for example of light alloy. The upper portion 11 of the support element is connected to the upper portion of the other support element, situated on the other side of the engine 7, by a cross-member such as the cross-member 12 shown in FIG. 3.

The contour of the support element 11, in elevation, as seen in FIG. 1, is substantially trapezoidal. The part 13 of the support element 11, which is fixed on the chassis 1, is slightly inclined, with respect to the perpendicular direction to the plane of the chassis 1, so that its upper end is slightly in front of its lower end. The fixing of the rear part 13, on the chassis 1, is ensured by at least one fixing device 14 adapted to filter noise and vibration and constituted essentially by two blocks of elastomeric material 15a, 15b, traversed by a threaded rod 16 fast to the part 13. These blocks 15a, 15b are arranged on each side of the front surface of the transverse member 5, and between two metallic cups 17a, 17b. The threaded rod 16 passes freely through, with a relatively large radial play, the front surface of the transverse member 5. Fixing is ensured by clamping of this front surface between the blocks 15a, 15b compressed by the screwing of a nut 18 on the threaded rod 16. The device 14 has practically nil flexibility to compression and to extension, so that the longitudinal deflections of the support element 8, with respect to the transverse member 5 and to the chassis 1, are substantially nil.

The lower portion of the support element 8 is fixed rigidly to the chassis 1 by at least one flat metallic lug 19 extending under the support element 8 and under the front part 4 of the chassis 1. This lug 19 is fixed respectively to the support element 8 and the chassis 1 by bolts 20 and nuts 21. Washers 22, in the form of a cup, are provided to serve as support members for the heads of the bolts 20. The screw v can also be provided to complete the fixing of the lower part of the support element 8 on the chassis.

The cheek 9 comprises an opening 23 for the passage of the drive-shaft 24 for the front drive wheels 25.

The engine 7 is fixed on the support element 8, as seen in FIG. 1, by means of parts 26, situated on each side of the engine, in the form of frustroconic cheeks rigidified by ribs 27 extending substantially along the generators of the trunk of the cone.

The large base 28 of the part 26 is fixed on the casing of the engine by bolts 28a whilst the small base 29 is fixed rigidly on the cheek 9 by bolts (not shown) passing through holes 30 provided in this cheek.

In a modification, the engine may be mounted on the cheek 9 of the support element 8 by reversing the frustoconical member 26 and by connecting the large base 28 of the connecting means L with the cheek and by connecting the small base 29 with the engine. In this modification, the holes 30 of the cheek 9 are opposite the pin openings contained in the large base portion 28 of the connecting means, so that gudgeon pins may be provided on the outer periphery of the large base 28 in place of the bolts 28a. The small base 29 is connected with the engine by bolts.

The engine 7, thus fixed on the support element 8, constitutes a cross-member which contributes to the rigidity of the chassis 1.

Figure 2:
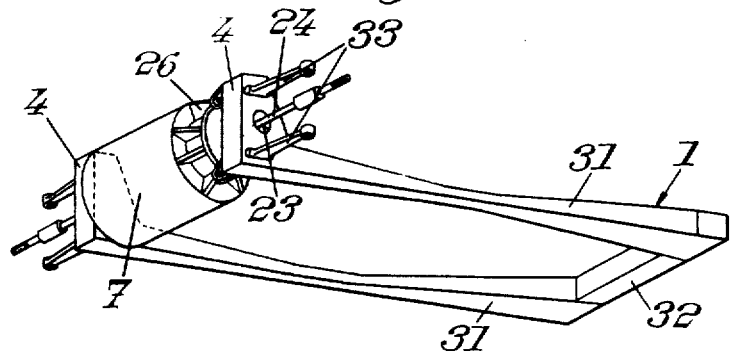
FIG. 2 shows in perspective, the chassis and the engine of a vehicle according to the invention.

Referring to FIG. 2, there can be seen a modification in which the chassis 1 comprises two longitudinal members 31, substantially parallel, of which the front ends constitute the raised parts 4 of the chassis. The rear ends of the longitudinal members 31 are connected by a transverse member 32 and the rear axle (not shown) is fixed to the chassis 1 substantially at the longitudinal level of the transverse member 32.

The engine 7 is arranged at the front, transversely, between the raised parts 4 and it is fixed rigidly to these parts 4 by means of parts 26. In the embodiment of FIG. 2, the engine 7 constitutes the only cross-member provided at the front of the chassis 1. The suspension arms 33 of the front wheels are hinged on the parts 4 of the chassis. The body, not shown in FIG. 2, is connected elastically to the chassis 1 and hence insulated from noise and vibration transmitted by the wheels to the chassis.

Figure 3:
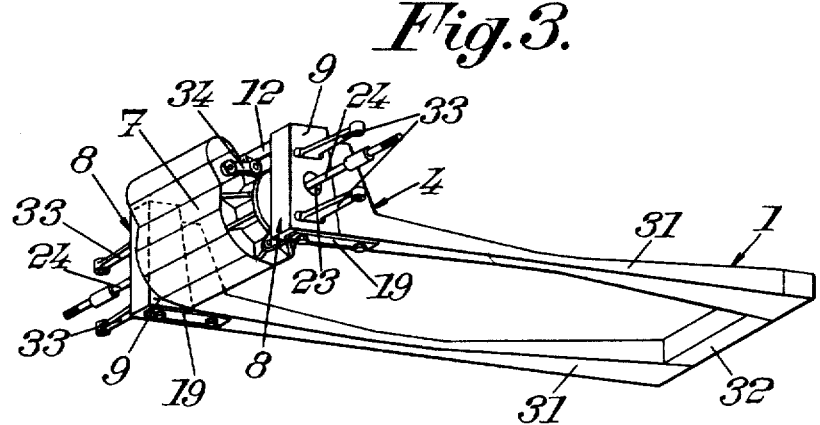
FIG. 3 shows, similarly to FIG. 2, a modification of the embodiment.

In the modification shown in FIG. 3, the support elements 8 of FIG. 1 will again be found, provided at the front of the chassis 1, the engine 7 being arranged transversely, at the front of the vehicle, and fixed rigidly to the lower part of the support elements 8. The cross-member 12 is provided to connect the upper parts of the support elements 8.

On each side of the engine 7, the rod 34 connects the upper part of this engine to the cross-member 12.

The suspension arms 33 of the front wheels are hinged on the support elements 8, so that the assembly of the engine 7, the support elements 8 and the wheels, form an easily removable unit. In a modification, the suspension arms 33 may be articulated directly on the engine 7.

The other elements of FIG. 3 which are similar to elements already described, are indicated by the same reference numerals and their description is not repeated.

In FIGS. 4 and 5, there can be seen an engine 7 equipped with linking elements 35a, 35b, 35c, 35d enabling fixing of the engine on the chassis to be ensured so that the translational deflections of the engine 7 with respect to the chassis following the longitudinal direction D (FIG. 4) and the transverse direction T (FIG. 5) of the vehicle are limited. Each linking element 35a . . 35d, is constituted by a block of elastic material working compression or in extension over slight thicknesses $e_1$, $e_2$, $e_3$, whilst the angular deflexions of the engine 7 around the axis O—O are permitted. In this way, the engine 7 will be able to oscillate around said axis on variations in the engine torque, so that these variations will be elastically absorbed. The relative flexibility, for angular deflections, of the fixing of the engine 7 on the chassis can be obtained, for example, by making it correspond to the work of shearing elastic elements 35a . . . 35d and/or by arranging these elastic elements close to the same axis parallel to that of the engine shaft, that is to say the distances $d_1$ and $d_2$ (see FIG. 4), are relatively slight. Due to these slight distances $d_1$ and $d_2$, the counter moment with respect to the axis O—O of the elastic linking element 35a . . 35d, is relatively slight.

In the solution of FIGS. 4 and 5, there is obtained an elastic linkage between the engine unit 7 and the chassis enabling the transmission to the latter of vibrations and stress due to operation of the engine to be reduced and in particular, variations in torque, without however this elastic linkage permitting substantial deflections in translation in the directions D and T as already explained. The engine 7 continues to participate in the rigidity of the chassis.

Whatever the embodiment adopted, there is obtained a vehicle having good driving accuracy by reason of its immediate response to all action on the steering control, both on a curve and in course of corrections on a rectilinear route. This is due to the fact that the transverse forces of inertia which appear on the mass of the engine or of the engine unit are transmitted to the wheels without delay and without consecutive oscillations, due to the absence of transverse flexibility, in the linkage, between the engine and the wheels.

The noise and vibrations transmitted to the cab are reduced, in particular as regards the noise due to the passage of the vehicle over an imperfectly flat terrain. In fact, the longitudinal shocks received by the wheels, which constitute the principle source of this noise and vibration, cause shaking of the chassis all the less as its longitudinal inertia is greater; according to the invention, this inertia is increased by that of the engine which is connected to the chassis without longitudinal flexibility.

In addition, the chassis can be lightened since the engine forms a rigid cross-member, between the longitudinal members, which replaces a transverse member normally provided.

It may be noted also that when the front axle is directly connected to the engine or to a support element of the engine, as in the case of FIG. 3, the assembly of the vehicle is greatly facilitated.

As is self-evident and as emerges from the foregoing, the invention is in no way limited to those of its types of application and embodiments which have been more especially envisaged; it encompasses, on the contrary, all modifications.

I claim:

1. In a motor vehicle including front and rear axles, the invention which comprises:

an engine;

a chassis for connecting the front axle with the rear axle, said chassis including a pair of parallel spaced longitudinal members each having at one end a raised portion;

a body connected to the chassis through resilient means enabling deflections between the body and the chassis in the longitudinal direction of the vehicle and substantially preventing other deflections; and means connecting said engine to and between said raised portions so that the engine extends transversely between said longitudinal members, thereby causing said engine to serve as a cross member for contributing to the rigidity of the chassis by opposing any substantial deflection between the engine and the chassis in longitudinal and transverse directions of the vehicle.

2. Apparatus as defined in claim 1, wherein said raised portions are arranged at the front ends of said longitudinal members; and further wherein said connecting means comprises on each side of the engine a rigid support element (8) having the form of a hollow caisson, said engine being rigidly connected with said support elements, and means (14) fastening said support elements with said raised portion, said fastening means opposing any substantial deflection of the support elements with respect to the chassis.

3. Apparatus as defined in claim 1, wherein said connecting means for connecting the engine with the chassis are rigid.

4. Apparatus as defined in claim 1, wherein said connecting means includes elastic linking means (14) connected between said engine and said chassis for causing the longitudinal and transverse forces acting on the engine to be applied to said linking means as forces of compression and extension, the thickness of said elastic linking means, in the compression direction, being slight, the arrangement of said elastic linking means being such that the angular deflections of the engine caused by variations in the torque thereof are transferred to the elastic linking means in the shear direction.

5. Apparatus as defined in claim 4, wherein said elastic linking means include blocks of elastomeric material.

6. Apparatus as defined in claim 1, wherein said connecting means comprise on each side of the engine a rigid support element in the form of a hollow caisson, said engine being rigidly fastened to said support elements, and suspension arm means connected with said support means and extending longitudinally of the engine for supporting wheels of the vehicle at the level thereof, whereby the engine, the support members, the suspension arm means and the associated wheels may be removed as a unit from the chassis.

7. In a motor vehicle including front and rear axles, the invention which comprises an engine;

a chassis for connecting the front axle with the rear axle, said chassis including a pair of parallel spaced longitudinal members (31) each having at its forward end a raised portion (4) which defines a caisson;

means for connecting transversely between said raised portions only said engine, said connecting means including a plurality of linking elements having blocks of elastic material operable in compression or extension, said blocks being arranged to prevent any substantial deflection of the engine in the longitudinal and transverse directions relative to the vehicle while permitting oscillation of the engine about its axis.

8. In a motor vehicle including front and rear axles, the invention which comprises:

an engine;

a chassis for connecting the front axle with the rear axle, said chassis including a pair of parallel spaced longitudinal members each having at the front end thereof a raised portion;

means connecting said engine between said raised portions, thereby causing said engine to serve as a cross member for contributing to the rigidity of the chassis by opposing any substantial deflection between the engine and the chassis in longitudinal and transverse directions of the vehicle, said connecting means comprising on each side of the engine a rigid support element; said engine being rigidly connected with said support elements; means fastening said support elements with said raised portions, said fastening means opposing any substantial deflection of the support elements with respect to the chassis, said fastening means comprising elastic means adapted to filter noise and vibration, and the lower portion of each support element being rigidly connected with said chassis; and cross member means for connecting the upper portions of said raised portions with each other, the lower portions of said support elements being connected together by said engine.

* * * * *